US008306791B2

(12) United States Patent
Yerramalla et al.

(10) Patent No.: US 8,306,791 B2
(45) Date of Patent: Nov. 6, 2012

(54) METHOD AND SYSTEM FOR MODELING THE PERFORMANCE OF A GAS TURBINE ENGINE

(75) Inventors: Sampath K. Yerramalla, Manchester, CT (US); Steven Wayne Butler, Columbia, CT (US); William Donat, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 501 days.

(21) Appl. No.: 12/643,579

(22) Filed: Dec. 21, 2009

(65) Prior Publication Data

US 2011/0153295 A1    Jun. 23, 2011

(51) Int. Cl.
*G06F 17/10* (2006.01)
*G06G 7/48* (2006.01)
(52) U.S. Cl. .................................. 703/2; 703/8
(58) Field of Classification Search .................... 703/2, 8
See application file for complete search history.

(56) References Cited

U.S. PATENT DOCUMENTS

| | | | |
|---|---|---|---|
| 6,909,960 B2 | 6/2005 | Volponi et al. | |
| 7,136,809 B2 | 11/2006 | Volponi | |
| 7,216,071 B2 | 5/2007 | Volponi | |
| 7,233,884 B2 | 6/2007 | Volponi | |
| 7,277,838 B2 | 10/2007 | Volponi et al. | |
| 7,415,328 B2 | 8/2008 | Volponi | |
| 7,441,448 B2 | 10/2008 | Volponi | |
| 7,472,100 B2 | 12/2008 | Volponi et al. | |
| 2003/0200069 A1 | 10/2003 | Volponi | |
| 2006/0047403 A1 | 3/2006 | Volponi et al. | |
| 2008/0154823 A1 | 6/2008 | Volponi et al. | |
| 2008/0221835 A1 | 9/2008 | Volponi | |

OTHER PUBLICATIONS

Brotherton et al.; eSTORM: Enhanced Self Tuning On-board Real-time Engine Model; Proceedings of the 2003 IEEE Aerospace Conference, Big Sky MT, Mar. 2003; pp. 1-13.*
Abdi; Factor Rotations in Factor Analyses; In: Lewis-Beck M., Bryman, A., Futing T. (Eds.) (2003). Encyclopedia of Social Sciences Research Methods. Thousand Oaks (CA): Sage; pp. 1-8.*

(Continued)

*Primary Examiner* — Hugh Jones
(74) *Attorney, Agent, or Firm* — O'Shea Getz P.C.

(57) ABSTRACT

A method for modeling the performance of a gas turbine engine is provided. The method includes the steps of: 1) providing a processor; 2) inputting flight condition parameter data and engine output parameter data into a gas turbine engine model operating on the processor, which model includes a physics-based engine model that uses the flight condition parameter data to produce estimated engine output parameter data, and determines residuals from the engine output parameter data and the estimated engine output parameter data; 3) partitioning the flight condition parameter data and residuals into training data and testing data; 4) performing a correlation reduction on the training data, which analysis produces correlation adjusted training data; 5) performing an orientation reduction on the correlation adjusted training data, which reduction produces orientation adjusted training data; 6) reviewing the orientation adjusted training data relative to at least one predetermined criteria, and iteratively repeating the steps of performing a correlation reduction and an orientation reduction using the orientation adjusted training data if the criteria is not satisfied, and if the criteria is satisfied outputting the orientation adjusted training data; 7) producing estimated corrections to the orientation adjusted training data using one or more neural networks; 8) evaluating the neural adjusted data using the partitioned testing data; and 9) modeling the performance of the gas turbine using the estimated corrections to the orientation adjusted training data.

13 Claims, 3 Drawing Sheets

OTHER PUBLICATIONS

Menon et al.; Startup Fault Detection and Diagnosis in Turbine Engines; vol. 7-3069; 2003; pp. 1-6.*

Costello et al.; Best Practices in Exploratory Factor Analysis: Four Recommendations for Getting the Most From Your Analysis; Practical Assessment Research & Evaluation, vol. 10, No. 7; Jul. 2005; pp. 1-9.*

Luppold et al.; Adaptive On-Wing Gas Turbine Engine Performance Estimation; IEEEAC paper#1112, Version 1, Updated Jan. 5, 2007; pp. 1-12.*

Donat et al.; Data Visualization, Data Reduction and Classifier Fusion for Intelligent Fault Detection and Diagnosis in Gas Turbine Engines; Proceedings of GT2007: Turbo Expo 2007: Power for Land, Sea and Air May 14-17, 2007, Montreal, Canada; pp. 1-10.*

Mina et al.; Fault Isolation with Principal Components Structured Models for a Gas Turbine; 2008 American Control Conference; Seattle, Washington, USA; Jun. 11-13, 2008; proceedings, pp. 4268-4273.*

Battiti, R. "Using Mutual Information for Selecting Features in Supervised Neural Net Learning", IEEE Transactions on Neural Networks, vol. 5, No. 4, Jul. 1994, pp. 537-548.

Karhunen et al. "Generalizations of Principal Component Analysis, Optimization Problems, and Neural Networks," Neural NEtworks, vol. 8, No. 4, Jan. 1, 1995, pp. 549-562.

Dunia et al. "Identification of Faulty Sensors Using Principal Component Analysis", Aiche Journal, Oct. 1996, vol. 42, No. 10, pp. 2797-2812.

* cited by examiner

METHOD AND SYSTEM FOR MODELING THE PERFORMANCE OF A GAS TURBINE ENGINE

BACKGROUND OF THE INVENTION

1. Technical Field

The present invention relates generally to the field of mathematical and empirical modeling. More specifically, the invention relates to a method and system for modeling the performance of a gas turbine engine.

2. Background Information

Early gas turbine engine models include piecewise linear state variable models (SVM) operable to describe reasonable behavior of an engine during steady state operation and mild transients. As processor speeds increased, more complex engine models that were a combination of linear and nonlinear physics based elements were created. While the latter provided greater fidelity for transient operation over an engine's operational flight envelope, the accuracy required for long-term performance tracking as well as the need to address engine-to-engine variation was inadequate.

Modeling using physics-based principles is a crucial element in conditional based monitoring and engine health management for gas turbine engines. However, modern gas turbine engines have complex mechanical systems that are, practically speaking, difficult to accurately model and represent using physics-based principles. The modeling difficulties associated with engine complexity are exacerbated by noisy or inaccurate sensors, engine-to-engine variations, and complex modifications made to engines during their life time. Consequently, it is very difficult to model a gas turbine engine with high fidelity using only a physics-based model component.

FIG. 1 illustrates a schematic diagram of an engine model 101 used for performance tracking. The major components include the monitored engine 103, a physics-based engine model 105 and a performance estimation module 107. The physics-based engine model 105 is typically an SVM and the performance estimation module 107 can be a Kalman filter observer.

The engine model 101 is driven by a set of input parameters 109 that command the engine 103. The input parameters 109 comprise flight parameters such as Mach number, altitude, ambient conditions (e.g., temperature and pressure) and others, and power setting parameters such as engine pressure ratio (EPR), engine low rotor speed, fan pressure ratio (FPR), and engine control parameters such as engine bleed air commands, variable geometry vane commands and others. The monitored engine output data 111 comprises data pertaining to gas path parameters (GPP) such as fuel, flow, internal shaft speeds, compressor, combustor and turbine temperatures and pressures and others. The physics-based engine model 105 outputs estimated parameter data 113 corresponding to each engine output parameter 111.

The estimated parameter data 113 may be used for a variety of purposes. The parameter data 113 provide for analytical redundancy if a channel mismatch were to occur, for example, in a multichannel redundant system such as a Full Authority Digital Engine Control (FADEC) (not shown), serving as an auctioneer between two redundant signals that have different values.

The physics-based engine model 105 estimated output data 113 are compared with the engine output parameter data 111 to form residuals 115. If the physics-based engine model 105 is an accurate representation of the monitored engine 103 and if the engine is performing under nominal conditions, the residuals 115 should be close to zero on the average. The residuals represent the difference between an actual engine output data 111 and the related engine model estimated output data 113. The magnitude of the residuals indicates the accuracy of the physics-based engine model 105. However, as the operating time of an engine increases beyond a certain point, its performance typically decreases and the residuals 115 deviate from zero.

The performance estimator 107 uses the residuals 115 to observe changes in performance across the engine's modules (e.g., compressor, combustor, turbine, etc.), in the form of adiabatic efficiencies, flow capacities, and turbine nozzle area deltas. This type of analysis is referred to as Gas Path Analysis (GPA) or Module Performance Analysis (MPA). The disparities between the physics-based engine model 105 and engine 103 outputs are used to modify the performance output of the engine model estimated outputs 113 to drive the residuals 115 to zero (on the average). In this manner, the physics-based engine model estimated outputs 113 more accurately reflect the current state of the engine 103 and the module performance deltas can be tracked over time to aid in determining proper engine work scope when the engine is removed for maintenance.

The model 101 described above and shown in FIG. 1 represents an ideal situation where the physics-based engine model 105 is a faithful representation of the engine 103 being monitored. However, the physics-based engine model 105 typically does not hold true in practice. Engine-to-engine variations, models simplified in order to save processing time, deviations caused by complicated improvements to the engine's hardware, bleed and stator vane schedules, cooling flows, handling bleeds, etc., over the engine's life cycle are not reflected in the model 105 and contribute to output disparities between the physics-based engine model 105 and engine 103. The disparities result in inaccurate estimations in the module performance tracking for the model 101 which can result in unnecessary engine maintenance or removals, etc. Due to the penalties and high costs associated with such events, this is undesirable for both engine manufacturers and airliners.

FIG. 2 illustrates an engine model 102 that is a variation of the model 101 shown in FIG. 1, wherein the input parameters 109 are stored in a database along with the residuals associated with those input parameters. This database is used for viewing the performance of the engine over a period of time. Once developed, output 116 from this database is used for empirical fine tuning of the physics-based engine model 105. Although this engine model 102 represents an improvement over the model 101 shown in FIG. 1, it can still be subject to data biases and correlations and therefore inaccurate.

SUMMARY OF THE INVENTION

According to an aspect of the present invention, a method for modeling the performance of a gas turbine engine is provided. The method includes the steps of: 1) providing a processor; 2) inputting flight condition parameter data and engine output parameter data into a gas turbine engine model operating on the processor, which model includes a physics-based engine model that uses the flight condition parameter data to produce estimated engine output parameter data, and determines residuals from the engine output parameter data and the estimated engine output parameter data; 3) partitioning the flight condition parameter data and residuals into training data and testing data; 4) performing a correlation reduction on the training data, which analysis produces correlation adjusted training data; 5) performing an orientation reduction on the correlation adjusted training data, which reduction produces orientation adjusted training data; 6) reviewing the orientation adjusted training data relative to at least one predetermined criteria, and iteratively repeating the steps of performing a correlation reduction and an orientation reduction using the orientation adjusted training data if the criteria is not satisfied, and if the criteria is satisfied outputting the orientation adjusted training data; 7) producing estimated corrections to the orientation adjusted training data using one or more neural networks; 8) evaluating the neural adjusted data using the partitioned testing data; and 9) modeling the performance of the gas turbine using the estimated corrections to the orientation adjusted training data.

According to another aspect of the present invention, a system for modeling the performance of a gas turbine engine is provided. The system includes a processor adapted to: a) receive flight condition parameter data and engine output parameter data; and b) have a physics based engine model that uses the flight condition parameter data to produce estimated engine output parameter data, and which model determines residual data from the engine output parameter data and the estimated engine output parameter data. The processor includes: a) a partitioning module for partitioning the flight condition parameter data and residual data into training data and testing data; b) a training module; c) a neural network module; and d) an evaluation module. The training module includes a correlation reduction module for reducing one or more correlations in the training data, which module produces correlation adjusted training data, an orientation reduction module for reducing one or more orientations in the correlation adjusted training data, which module produces orientation adjusted training data, and a review module for evaluating the orientation adjusted training data relative to at least one predetermined criteria, and directing the orientation adjusted training data iteratively within the training module if the criteria is not satisfied, and if the criteria is satisfied outputting the orientation adjusted training data. The neural network module is adapted to produce estimated corrections to the orientation adjusted training data using one or more neural networks. The evaluation model is adapted to evaluate the neural adjusted data using the partitioned testing data. The processor is further adapted to model the performance of the gas turbine using the estimated corrections to the orientation adjusted training data.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

The present invention includes a method and system for modeling the performance of a gas turbine. The invention utilizes a modular framework and can be deployed as an application program within a processor, CPU, and/or tangibly embodied on a program storage device (e.g., deployed in the form of software, hardware, or some combination thereof). The application code for execution can reside on a plurality of different types of computer readable media known to those skilled in the art. The processing devices adapted to implement the present turbine engine performance models may be provided with the gas turbine engine or may be independent from the engine, adapted to receive data from the engine.

Figure 1:
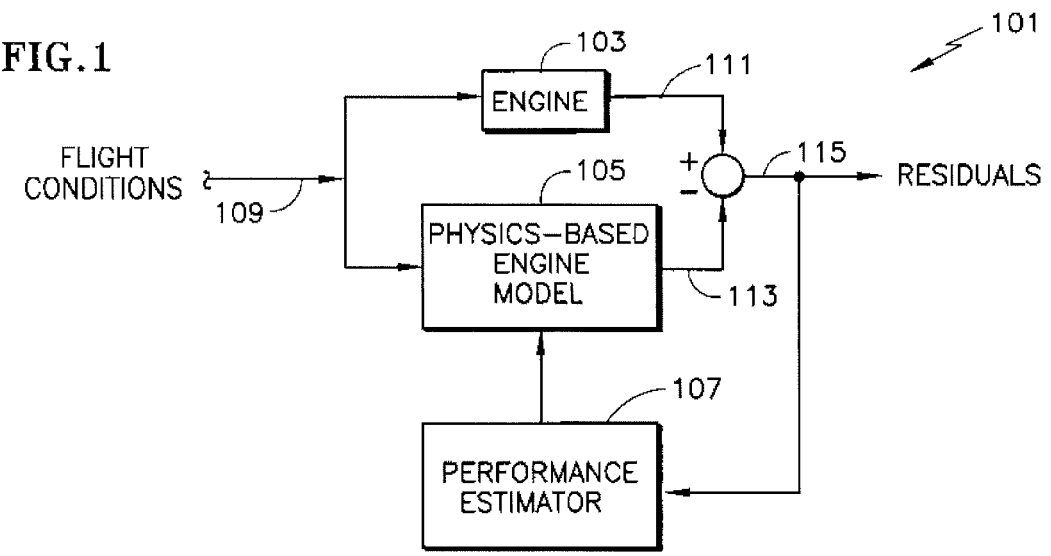
FIG. 1 is a schematic of an engine model for a gas turbine engine.
Figure 2:
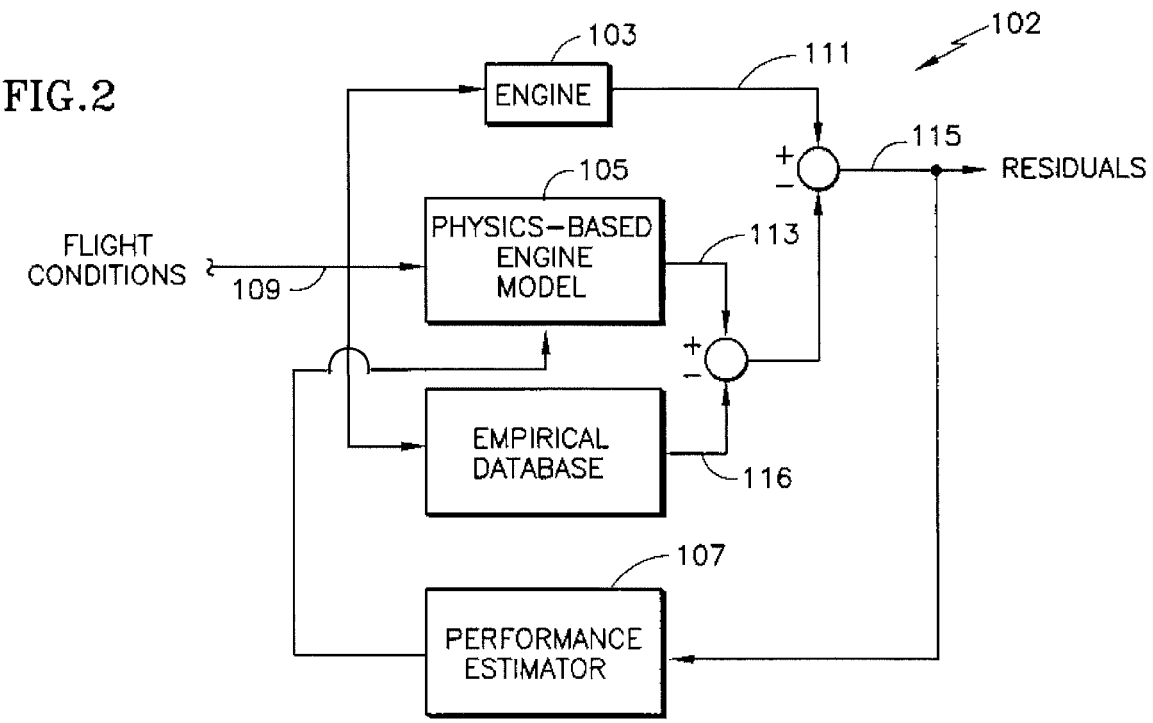
FIG. 2 is a schematic of another engine model for a gas turbine engine, including a database.

As stated above, various different engine models 101, 102 exist that are operable to create residual values for given flight condition parameters; e.g., Mach number, altitude, ambient conditions (e.g., temperature and pressure) and others, and power setting parameters such as engine pressure ratio (EPR), engine low rotor speed, fan pressure ratio (FPR), and engine control parameters such as engine bleed air commands, variable geometry vane commands and others. Some of the aforesaid engine models 102 include the ability to develop a database of residual and flight condition values. The present method of modeling the performance of a gas turbine engine utilizes such an engine model and builds upon it to create an engine model having significantly improved accuracy. An example of an acceptable engine model that produces residual values is shown in FIG. 2. The present invention method of modeling is not limited to that engine model, however.

Figure 3:
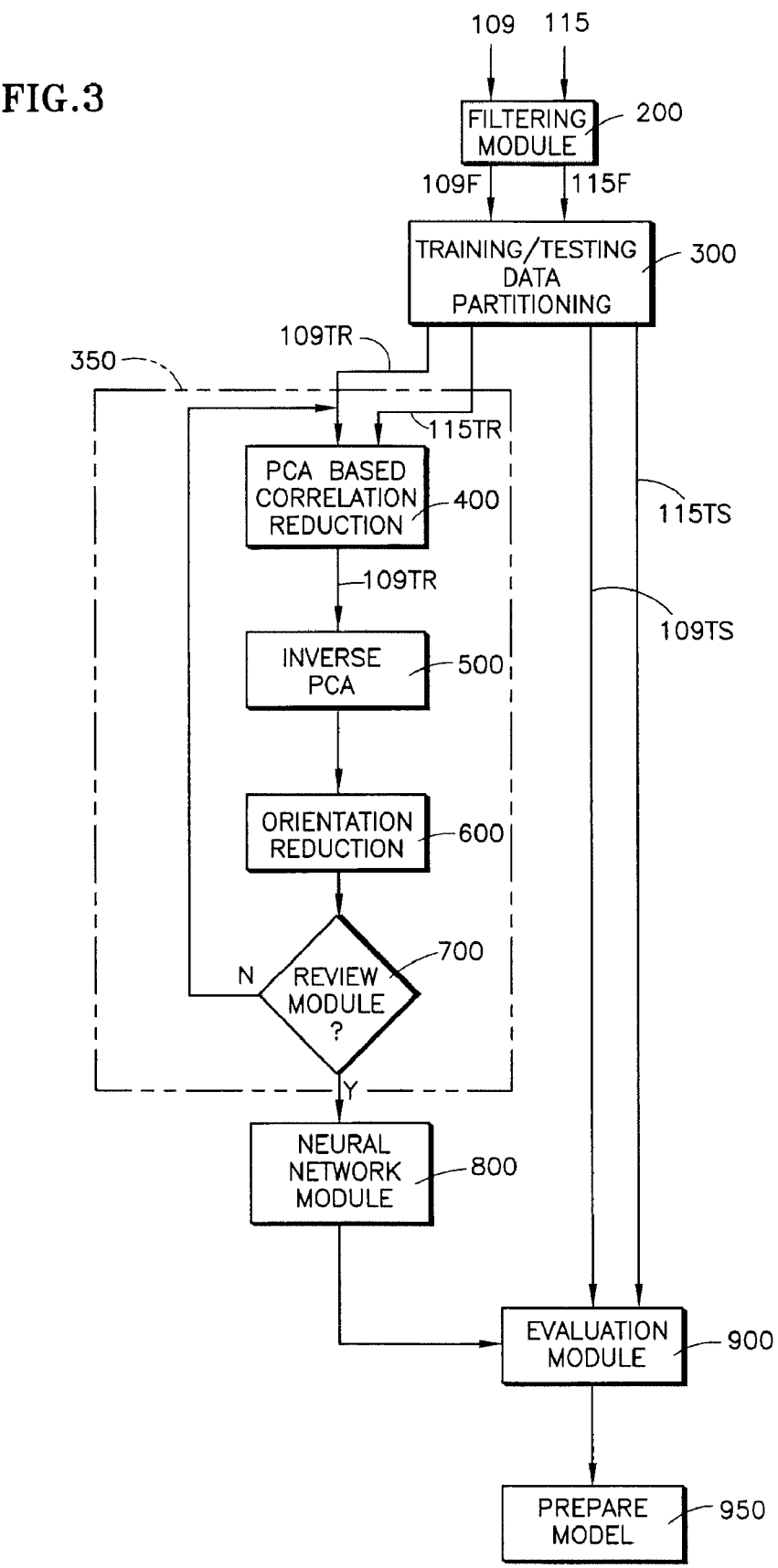
FIG. 3 is a block diagram of the present method for modeling the performance of a gas turbine engine.

Now referring to FIG. 3, according to one aspect of the present invention modeling method, the flight condition parameter values and the residual values are subjected to a Filtering Module 200 that identifies and removes outlying data points ("outliers"). A variety of different filtration techniques can be used. In a preferred embodiment, the Filtering Module 200 utilizes a Principal Component Analysis (PCA) to filter the data and thereby identify and remove outlying data points ("outliers") that would otherwise negatively affect the accuracy of the modeling. The inputs to the Filtering Module 200 include the flight condition parameters 109 and the residual values 115.

The data input to the Filtering Module 200 is initially organized, for example in a matrix form with columns and rows. The number of columns reflects the number of different flight condition parameters. Each row, in contrast, contains flight condition data associated with a distinct event (e.g., an engine flight) for each parameter. The number of rows is typically a large number (in the order of hundreds, or thousands), and increases with the life of the engine. The columns are organized within the matrix based on the relative degree of variance within the data; e.g., the flight condition parameter having the most variant data is positioned within the first column, the parameter having the second most variant data is positioned within the second column, etc. The difference in variance from column to column typically does not change linearly. In most instances the difference in variance change is significant in the first few columns, and subsequently tapers to a much smaller rate of change; e.g., an exponential distribution. The variance distribution is unique for each engine, however. During filtration, the present method performs the PCA analysis using a matrix based on a limited number of columns; e.g., those columns most likely to contain a high percentage of outliers. By using a limited "N" number of columns (referred to as PC1, PC2, etc.), each with a high percentage of outliers, the present filtration process is likely to identify a significant percentage of all outliers with limited processing demands. The present PCA analysis for filtration may, therefore, be described as applied to a "i" row by "N" column matrix. In most applications, a matrix have two (N=2) columns (e.g., PC1, PC2) is adequate. The present filtration step is not, however, limited to using a two column data matrix.

Figure 4A:
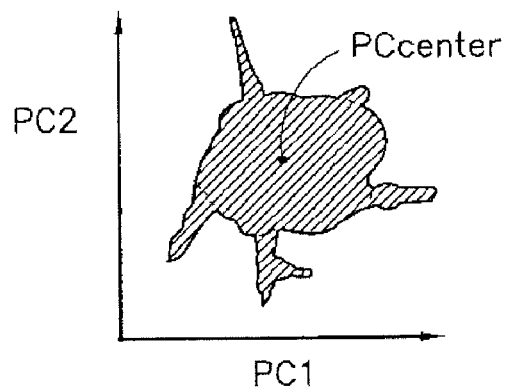
FIG. 4A is a graph of input parameter data in PCA format, showing PC1 data vs. PC2 data in unfiltered form.
Figure 4B:
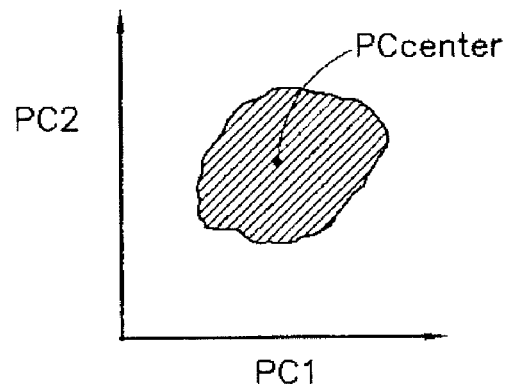
FIG. 4B is a graph of input parameter data in PCA format, showing PC1 data vs. PC2 data in filtered form, with outliers removed.

During the PCA analysis, a distance value is calculated (using the Euclidian distance metric) between a PCA signal based on the data points within each row (i.e., which signal is defined in terms of the values in that row; e.g., PC1, PC2) and an average value of all the PCA signals. This process creates an array of distance values ("scalar values") having the same number of rows as the original data matrix. A predetermined threshold value (typically referred to as "K", having a magnitude, for example, between 1 and 3) is used for identifying outliers. All of the PCA signals having a scalar value above the threshold value (e.g., "K" times the standard deviation of the distance values) are identified. These data points represent the data points within the flight condition signals 109 that are outside what is considered nominal and are consequently defined as outliers. The set of outliers is a sub-set of the original set of distance values, and typically constitutes only a small portion (depending on the value of K) of the total number of data points "i". FIGS. 4A and 4B graphically illustrate the PCA analysis process. The data 109 is projected in two dimensions (i.e., PC1 and PC2) as a PCA signal, and the distance between each PCA signal and the average PCA signal ($PC_{center}$) is shown. The outliers present in most data sets are readily apparent as anomalies to the primary data group.

Once the outliers are identified, the data values 109 in the rows identified as outliers, and the residuals 115 associated with those data values are removed from the signals 109 that will be subsequently used within the model. The flight condition signals 109 and associated residuals 115 that remain are referred to as filtered signals 109F and filtered residuals 115F. FIG. 4B illustrates the data group with the outliers removed through filtration.

The above described filtration process is a preferred process because of the accuracy gained with relatively low data processing requirements. The present method is not limited to this filtering process, and other processes may be used.

Now referring back to FIG. 3, according to another aspect of the present method, the filtered signal data and residuals (109F, 115F) are subjected to a data partitioning within a data Partitioning Module 300. In this Module 300, a predetermined percentage (typically 60% to 80%) of the filtered signals 109F and 115F is randomly selected and defined as training data (109TR, 115TR), and the remaining percentage is defined as testing data (109TS, 115TS). The testing data is used within an Evaluation Module 900 as will be explained below. The partitioning percentages (e.g., 60/40, 70/30, 80/20) are not limited to any particular split and can be adjusted to suit the application on hand.

The training data (109TR, 115TR) from the Partitioning Module 300 are subsequently used within a Training Module 350 that includes a Correlation Reduction Module 400, an Orientation Reduction Module 600, and a Review Module 700. As will be described, the training data is subjected serially to the Correlation Reduction Module 400, Orientation Reduction Module 600, and the Review Module 700 in an iterative process. Within the Review Module 700, certain criteria are applied to the training data. If one or more of the criteria are met, then the training data is passed onto a Neural Network Module 800. If no criteria are met, then the training data iteratively returns to the Correlation Reduction Module 400 and once again is passed through the Training Module 350. Examples of review criteria include data within an acceptable variance range, or data that has iteratively passed through the Training Module 350 a predetermined number of times. Other criteria may be used alternatively.

The Correlation Reduction Module 400 operates to reduce non-uniformity in the residuals that can introduce biases and shape-shifts within the data. In this Module 400, the 109TR portion of the training data is again subject to a PCA analysis. The PCA analysis is applied in the manner described above within the Filtering Module 300 with the exception that the PCA process is applied to the filtered data within all of the columns; i.e., each flight condition parameter is considered. As described above, the PCA transformed data is used for determining the scalar distance values corresponding to the data values in each row (109TR). Like the Filtering Module PCA process, the scalar values are arranged in a matrix having the same number of rows as the original data matrix, and the values are sorted in descending order from the most variant value to the least variant value. The most variant value is the greatest distance from the average scalar value, and is the one that is causing the highest correlation in the data. Unlike the Filtering Module 200, the most variant points in this Module 400 are adjusted rather than eliminated. The variant points are adjusted such that their contribution to the overall correlation is minimized after the adjustment. For example, while each point is adjusted, the points that have more variance are adjusted more than those with less variance. The adjustment is preferably performed in a gradual manner to prevent excessive adjustment. The following equation is an example of an equation that can be used to adjust the data and decrease the overall correlation in the residuals:

$$P_{after} = P_{before} + \epsilon (P_{center} - P_{before}) \tag{1}$$

Figure 5A:
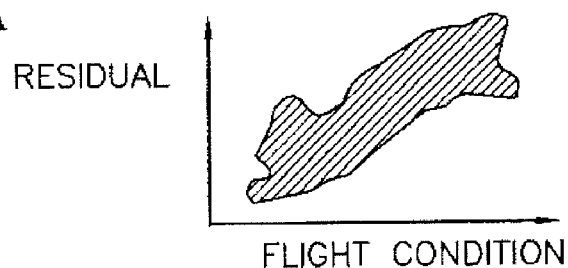
FIG. 5A is a graph of residual data values vs. flight condition data values prior to correlation reduction and orientation reduction.
Figure 5B:
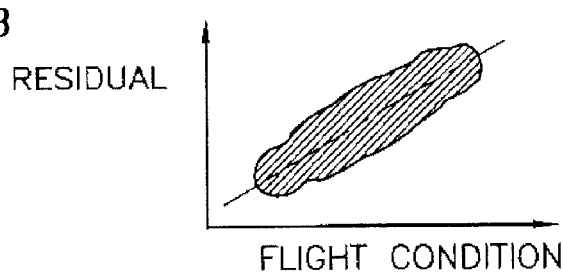
FIG. 5B is a graph of residual data values vs. flight condition data values with correlation reduction performed.

In the above equation, $P_{before}$ and $P_{after}$ are the position of a point in the PCA data before and after adjustments respectively. $P_{center}$ is the position of the center of the PCA cluster ($PC1_{average}$, $PC2_{average}$). The constant value "$\epsilon$" is a learning constant that determines the rate of adjustment (typically between 0.1 and 0.5). FIG. 5A diagrammatically illustrates correlated data prior to the above-described correlation reduction. FIG. 5B illustrates the data after the correlation reduction is performed. It should be noted that the before and after depictions of correlated data illustrate a single iterative change. Using the present method the correlation reduction process may take several iterative steps.

After the data has been adjusted within the Correlation Reduction Module 400, the data is subjected to a reverse PCA process 500 that returns the data from its PCA analysis form to its original form, now adjusted as described above. In this form, any correlation that may exist within the data is decreased.

The Correlation Reduction Module 400 does not, however, reduce any orientation that may exist within the data; e.g., the magnitude of the residuals within the signal data 109TR for a given event may vary between flight condition parameters. If the variance in residuals is sufficiently significant, the residual data may not be "flat" across the parameters; i.e., it may have a sloped orientation. FIG. 5B, for example, diagrammatically illustrates non-flat data that may be fitted along a sloped line. To reduce the slope of the residuals, the data is subjected to orientation (slope) reduction process within the Orientation Reduction Module 600.

Figure 5C:
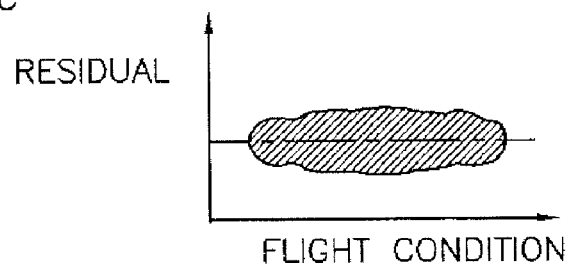
FIG. 5C is a graph of residual data values vs. flight condition data values with orientation reduction performed.

The Orientation Reduction Module 600 first evaluates if there is an orientation within the data by fitting a line to the residual data points 115TR associated with each flight condition parameter. The slopes of the individual fitted lines are collectively averaged, and the average slope is used as a basis for adjusting all of the data. The residual engine output values are rotated in the opposite direction of the average slope for each flight condition. Like the correlation reduction process described above, the orientation reduction adjustments are performed gradually. FIG. 5C illustrates the data shown in FIG. 5B subject to an orientation reduction.

The now adjusted training data (109TR, 115TR) is subsequently input into the Review Module 700 where, as described above, the adjusted training data is evaluated relative to certain criteria (e.g., variance range, number of Training Module iterations, etc.). The present method is not limited to any particular review criteria. Once one or more of the criteria are met, the adjusted training data transfers from the Training Module 350 to a Neural Network Module 800.

The Neural Network Module 800 utilizes learning process that model the adjusted residuals as a function of the flight condition parameters 109, and produces an estimate of the correction required, if any, to reduce the residual between the engine output parameters 111 and the output parameters 113 produced by the physics-based engine model. The neural network module consists of multiple layers of inter connected computational units known as neurons or nodes, where error from learning is propagated back to the nodes and their connection strengths adjusted. This architecture is referred to as feed-forward, back propagation artificial neural networks. Each neural network is defined by a series of layers consisting of an input layer, hidden layers, and an output layer. Each layer consists of a number of neurons. In terms of the present method, the algorithm models the adjusted residuals as a function of the flight condition parameters, and produces an estimate of the correction required, if any, to reduce the residual between the engine output parameters 111 and the output parameters 113 produced by the physics-based engine model. The input layer consists of four (4) neurons for each flight condition parameter, the hidden layer is made up of five (5) neurons, and the number of output layer neurons has one (1) neuron for the adjustment for a gas path parameter. A nonlinear transfer function (sigmoid) is used in the hidden layer and a linear transfer function is used in the output layer. Because each neural network has one output, there are multiple neural networks, one network for each gas path parameter.

The estimated corrections for the residuals produced within the Neural Network Module 800 are utilized within an Evaluation Module 900. The purpose of the Evaluation Module 900 is to ensure that the trained Neural Network Module 800 is accurately accounting for the difference between the Engine Module 103 and the Physics-Based Engine Model Module 105. The Evaluation Module 900 utilizes an engine model similar to that shown in FIG. 2. In the Evaluation Module 900, the "trained" Neural Network Module 800 (i.e., the Neural Network Model trained with the training data from the Training Module 350) is used as the empirical database as shown within FIG. 2. Within the Evaluation Module 900, however, the engine model does not use a performance estimator module (e.g., the estimator 107 shown in FIG. 2). The residual data used within the Evaluation Module 900 before neural network correction is 115TS. The trained residual value from the Neural Network Module 800 is added to the teats residual value (115TS) as a correction within the Evaluation Module 900. The corrected residual data can be plotted to visually check the performance of the neural network and verify that the neural network is performing in a satisfactory manner. If the neural network is operating in a satisfactory manner, the trained neural network is finalized and used as the empirical database module as shown within FIG. 2.

One or more embodiments of the present invention have been described. Nevertheless, it will be understood that various modifications may be made without departing from the spirit and scope of the invention. Accordingly, other embodiments are within the scope of the following claims. The invention is not limited to any particular software language described or implied in the figures. A variety of alternative software languages may be used for implementation of the invention. Some components and items are illustrated and described as if they were hardware elements, as is common practice within the art. However, various components in the method and system may be implemented in software or hardware.

What is claimed is:

1. A method for modeling the performance of a gas turbine engine, comprising the steps of:
   providing a processor;
   inputting flight condition parameter data and engine output parameter data into a gas turbine engine model operating on the processor, which model includes a physics-based engine model that uses the flight condition parameter data to produce estimated engine output parameter data, and determines residual data from the engine output parameter data and the estimated engine output parameter data;
   partitioning the flight condition parameter data and residual data into training data and testing data;
   performing a correlation reduction on the training data, which analysis produces correlation adjusted training data;
   performing an orientation reduction on the correlation adjusted training data, which reduction produces orientation adjusted training data;
   reviewing the orientation adjusted training data relative to at least one predetermined criteria, and iteratively repeating the steps of performing a correlation reduction and an orientation reduction using the orientation adjusted training data, and reviewing if the criteria is not satisfied, and if the criteria is satisfied outputting the orientation adjusted training data;
   producing estimated corrections to the orientation adjusted training data using one or more neural networks;
   evaluating the neural adjusted data using the partitioned testing data; and
   modeling the performance of the gas turbine using the estimated corrections to the orientation adjusted training data.

2. The method of claim 1, wherein the step of performing a correlation reduction includes performing a principal component analysis (PCA) on the training data to reduce correlations within the training data, which analysis produces the correlation adjusted training data, and the method further includes the step of performing a reverse PCA on the correlation adjusted training data.

3. The method of claim 2, wherein the PCA is performed on all of the training data.

4. The method of claim 1, further comprising the step of filtering the flight condition parameter data to remove outliers.

5. The method of claim 4, wherein the filtering step includes performing a PCA on the flight condition parameter data to remove the outliers.

6. The method of claim 5, wherein the flight condition parameter data are organized in matrix of engine event by flight condition parameter, and the filtering step includes removing data from any engine events having outliers.

7. The method of claim 6, wherein flight condition parameter data in less than all of the flight condition parameters is considered in the filtering step.

8. A system for modeling the performance of a gas turbine engine, comprising:
- a processor adapted to receive flight condition parameter data and engine output parameter data, and adapted to have a physics based engine model that uses the flight condition parameter data to produce estimated engine output parameter data, and determines residual data from the engine output parameter data and the estimated engine output parameter data, wherein the processor includes:
- a partitioning module for partitioning the flight condition parameter data and residual data into training data and testing data;
- a training module having a correlation reduction module for reducing one or more correlations in the training data, which module produces correlation adjusted training data, an orientation reduction module for reducing one or more orientations in the correlation adjusted training data, which module produces orientation adjusted training data, and a review module for reviewing the orientation adjusted training data relative to at least one predetermined criteria, and directing the orientation adjusted training data iteratively within the training module if the criteria is not satisfied, and if the criteria is satisfied outputting the orientation adjusted training data;
- a neural network module for producing estimated corrections to the orientation adjusted training data using one or more neural networks; and
- an evaluation model for evaluating the neural adjusted data using the partitioned testing data; and
- wherein the processor is further adapted to model the performance of the gas turbine using the estimated corrections to the orientation adjusted training data.

9. The system of claim 8, wherein the correlation reduction module is adapted to perform a principal component analysis (PCA) on the training data to reduce correlations within the training data, which analysis produces the correlation adjusted training data, and to perform a reverse PCA on the correlation adjusted training data.

10. The system of claim 9, wherein the correlation reduction module is adapted to perform a PCA on all of the training data.

11. The system of claim 8, wherein the processor is further includes a filtering module for filtering the flight condition parameter data to remove outliers.

12. The system of claim 11, wherein the filtering module is adapted to perform a PCA on the flight condition parameter data to remove the outliers.

13. The system of claim 12, wherein filtering module is adapted to consider flight condition parameter data associated with less than all of the flight condition parameters.

* * * * *